US009128541B2

(12) United States Patent
Fergusson et al.

(10) Patent No.: US 9,128,541 B2
(45) Date of Patent: Sep. 8, 2015

(54) APPARATUS TO SENSE STYLUS NIB PRESSURES

(71) Applicant: Research In Motion Limited, Waterloo (CA)

(72) Inventors: Andrew Ashraf Fergusson, St. Clements (CA); Cornel Mercea, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 246 days.

(21) Appl. No.: 13/803,548

(22) Filed: Mar. 14, 2013

(65) Prior Publication Data
US 2014/0267182 A1 Sep. 18, 2014

(51) Int. Cl.
G06F 3/033 (2013.01)
G06F 3/0354 (2013.01)
G06F 3/0338 (2013.01)
G06F 3/01 (2006.01)

(52) U.S. Cl.
CPC ............ G06F 3/03545 (2013.01); G06F 3/016 (2013.01); G06F 3/0338 (2013.01); G06F 3/03543 (2013.01)

(58) Field of Classification Search
None
See application file for complete search history.

(56) References Cited

U.S. PATENT DOCUMENTS

| 4,786,764 | A | 11/1988 | Padula et al. | |
| 5,475,401 | A | 12/1995 | Verrier et al. | |
| 5,571,997 | A | 11/1996 | Gray et al. | |
| 6,264,611 | B1* | 7/2001 | Ishikawa et al. | 600/486 |
| 8,154,536 | B2 | 4/2012 | Burström et al. | |
| 2007/0025805 | A1 | 2/2007 | Lapstun et al. | |
| 2011/0169775 | A1 | 7/2011 | Liaw et al. | |
| 2013/0257824 | A1* | 10/2013 | Wang et al. | 345/179 |

FOREIGN PATENT DOCUMENTS

DE 102005017936 A1 10/2006

OTHER PUBLICATIONS

Extended European Search Report from related European Patent Application No. 13159122.4 dated Oct. 9, 2013; 9 pages.

* cited by examiner

Primary Examiner — Muhammad N Edun
(74) Attorney, Agent, or Firm — Jon Gibbons; Fleit Gibbons Gutman Bongini & Bianco P.L.

(57) ABSTRACT

A stylus has a stylus barrel and a stylus nib that can move with respect to the stylus barrel. A first pressure sensor is configured to sense air pressure that corresponds to force being supplied to the stylus nib and a second pressure sensor serves to sense ambient air pressure. A control circuit operably couples to both pressure sensors and determines a gauge pressure value as corresponds to force being applied to the stylus nib. By one approach a temperature sensor can also operably couple to the control circuit and provide temperature information that the control circuit can utilize when determining the aforementioned gauge pressure value.

15 Claims, 2 Drawing Sheets

APPARATUS TO SENSE STYLUS NIB PRESSURES

FIELD OF TECHNOLOGY

The present disclosure relates generally to styli, and more particularly, to sensing stylus nib pressure.

BACKGROUND

Various styli are known and typically serve in conjunction with a scribing surface that is configured to work with a corresponding stylus. Generally speaking, a stylus is typically a hand-held writing utensil that often (but not exclusively) has a pencil-like elongated form factor and that includes at least one pointed end configured to interact with the scribing surface. Using a stylus as an input mechanism with, for example, a display, offers a variety of advantages over a fingertip including the opportunity for increased precision as well as an expression modality that accords with the user's own past experience with a pencil or pen.

Some styli include an integral force sensor. So configured, the stylus can detect the force that the user employs from moment to moment when bearing the stylus tip down on a scribing surface. This information can be used by a corresponding host electronic device in a variety of ways. As one simple example, the amount of force being applied to the scribing surface via stylus input can serve to control the relative thickness of a corresponding line being rendered on a display.

Such styli typically employ a movable nib as the stylus tip. This movable nib, in turn, mechanically couples to the force sensor. In this manner, as the nib is forced to move into the stylus as the user applies pressure, the force sensor detects this increased pressure and the sensed change is processed to provide an application-specific stylus input to the host device. Ordinary approaches in these regards use force sensors that employ optical, piezoelectric, and/or resistive sensors. Although these expedients can provide useful and reliable sensed-force information, typical known arrangements have drawbacks.

DETAILED DESCRIPTION

Figure 1:
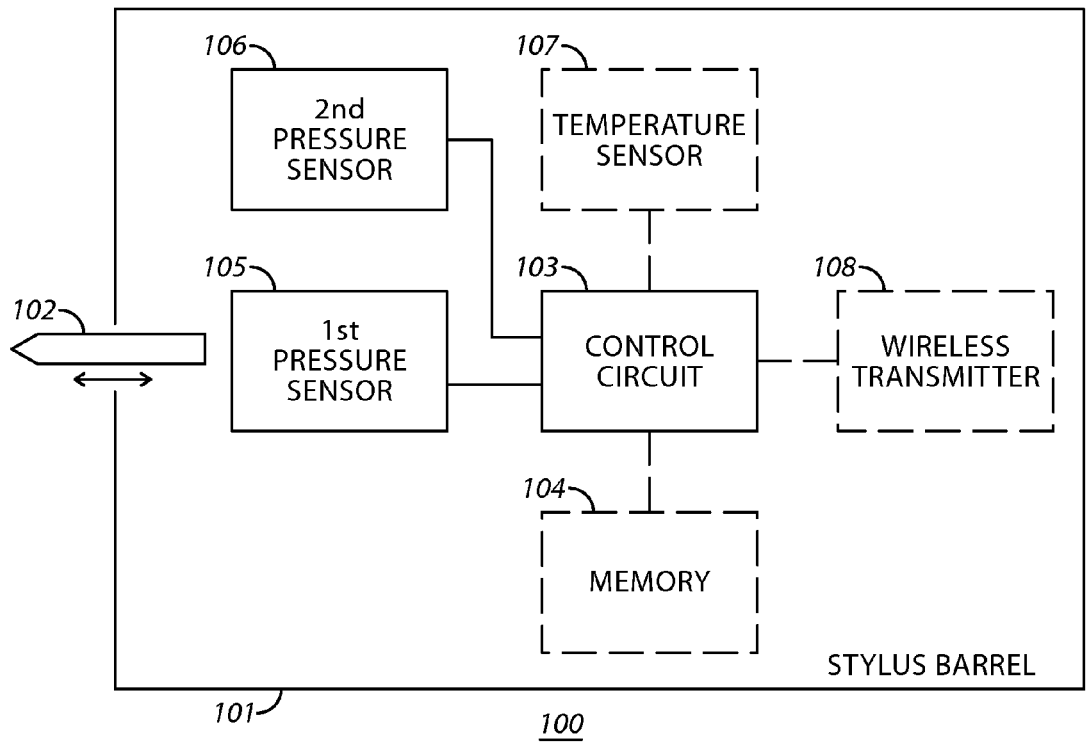
FIG. 1 is a block diagram in accordance with the disclosure.

The following describes an apparatus pertaining to a stylus having a stylus barrel and a stylus nib that can move with respect to the stylus barrel. A first pressure sensor is configured to sense air pressure that corresponds to force being supplied to the stylus nib and a second pressure sensor serves to sense ambient air pressure. A control circuit operably couples to both pressure sensors and determines a gauge pressure value as corresponds to force being applied to the stylus nib. By one approach a temperature sensor can also operably couple to the control circuit and provide temperature information that the control circuit can utilize when determining the aforementioned gauge pressure value, to render the system at least substantially temperature invariant.

By one approach the above-described first pressure sensor pneumatically couples to a fluid-filled bladder that deforms in response to the application of force to the stylus nib. This bladder can be filled, for example, with at least one gas including, but not limited to, atmospheric air (in which case the fluid-filled bladder comprises an air bladder).

When using the fluid-filled bladder, a mechanical stop can serve to prevent the fluid-filled bladder from deforming beyond a given amount of deformation. By one approach this mechanical stop can comprise, at least in part, a cap that fits over the fluid-filled bladder and between the bladder and the stylus nib. If desired, this cap can be comprised, at least in part, of an electrically-conductive material. So configured, when the bladder deforms to the point where the cap meets an opposing surface to effect the stop functionality, the electrically-conductive material can serve to complete an electrical circuit to thereby provide a signal indicating this state.

So configured, one or more air pressure sensors can serve as a reliable force sensor in a stylus application setting. The use of two air pressure sensors as described permits the control circuit to employ these components in a self-calibrating manner. Accordingly, such a stylus can be reliably used at a variety of altitudes and regardless of changing ambient atmospheric conditions without any need to conduct, manually or automatically, a separate calibration activity to ensure the accuracy of the sensed-pressure information. Since miniature air pressure sensors are readily available at very low cost as compared to force sensors using other force-sensing modalities, these components permit a reliable and accurate force-sensing stylus to be provided at a reduced cost as well.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a view of a stylus 100 that comports with at least many of the present teachings. This stylus 100 includes a stylus barrel 101 and a stylus nib 102. The stylus barrel 101 is presumed, for the sake of this description, to have an elongated form factor that is sized and configured to be conveniently handheld and accurately manipulated as a handheld scribing instrument. There are numerous such form factors known in the art. As the present teachings are not overly sensitive to any particular choices made in these regards, further elaboration will not be offered here for the sake of brevity.

The stylus nib 102 can comprise, for example, an elongated, thin, cylindrical shaft having a scribing tip at one end and an opposing end. The stylus nib 102 is configured to move in and out of the stylus barrel 101 as a user grasps the stylus barrel 101 and imposes (and relieves) longitudinally-aligned forces upon the stylus nib 102 while scribing with the stylus 100. Again, numerous approaches are known in these regards and therefore further details need not be presented here.

In this illustrative example the stylus 100 includes a control circuit 103 that operably couples, if desired, to an optional memory 104. Such a control circuit 103 can comprise a fixed-purpose hard-wired platform or can comprise a partially or wholly programmable platform. These architectural options are well known and understood in the art and require no further description here. This control circuit 103 is configured (for example, by using corresponding programming as will be well understood by those skilled in the art) to carry out one or more of the steps, actions, and/or functions described herein.

The memory 104 may be integral to the control circuit 103 or can be physically discrete (in whole or in part) from the control circuit 103 as desired. This memory 104 can also be local with respect to the control circuit 103 (where, for example, both share a common circuit board, chassis, power supply, and/or housing).

This memory 104 can serve, for example, to non-transitorily store the computer instructions that, when executed by the control circuit 103, cause the control circuit 103 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM)).

Also per this illustrative example the stylus 100 includes a first pressure sensor 105 and a second pressure sensor 106, both of which operably couple to the control circuit 103. The first pressure sensor 105 is configured to sense a pressure that corresponds to force being applied to the stylus nib 102. As will be described below in more detail, this first pressure sensor 105 can be configured, in particular, to sense air pressure that corresponds to force being applied to the stylus nib 102. The second pressure sensor 106, in turn, can be configured to sense ambient air pressure.

So configured, the control circuit can be configured to determine gauge pressure value as corresponds to force being applied to the stylus nib. "Gauge pressure" refers to pressure relative to the local atmospheric or ambient pressure. Generally speaking, such a determination can be based upon subtracting the sensed ambient air pressure from the sensed air pressure that corresponds to force being applied to the stylus nib 102.

If desired, the stylus 100 can further optionally include one or more temperature sensors 107 that operably couple to the control circuit 103 to compensate for temperature variations. Such a temperature sensor 107 can provide temperature information that the control circuit 103 can also utilize when determining, for example, the aforementioned gauge pressure value.

In addition, the stylus 100 may optionally include a wireless transmitter 108 that operably couples to the control circuit 103. This wireless transmitter 108 can utilize any of a variety of wireless carriers as desired including light-based carriers, radio-frequency-based carriers, sound-based carriers, and so forth. So configured, the control circuit 103 can transmit information regarding determined forces being applied to the stylus nib 102 via the wireless transmitter 108. A variety of approaches are already known as regards the wireless transmission of detected-force information by a stylus and therefore further details are not offered here in these regards.

This illustrative example presumes that the foregoing components are at least partially disposed within the stylus barrel 101. If desired, however, these teachings will support other approaches in these regards. For example, if desired, one or more of the aforementioned components can be disposed on an exterior surface of the stylus barrel 101.

For the sake of illustration but without intending any particular specific limitations by way of the specificity of the following examples, a particular approach to configuring the aforementioned first pressure sensor 105 is now provided.

Figure 2:
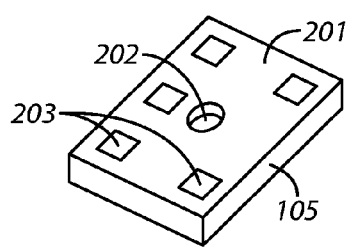
FIG. 2 is a perspective view in accordance with the disclosure.

Referring to FIG. 2, the first pressure sensor 105 can comprise an integrated circuit package 201 configured as an air pressure sensor. This integrated circuit package 201 includes an aperture 202 disposed through the bottom side thereof to provide a pneumatic pathway between an interior pressure-sensitive component and the external environment. The integrated circuit package 201 also includes a plurality of electrodes 203 disposed on that same bottom side. So configured, the integrated circuit package 201 can be surface mounted to an appropriately-configured printed circuit board in accordance with well-understood prior art techniques.

Numerous such integrated circuit packages configured as air pressure sensors are known in the art and will suffice for this application. By one approach, a second integrated circuit package that is the same as the one employed as the first pressure sensor 105 can serve as the second pressure sensor 106 or a different integrated circuit package can serve in these regards as desired.

Figure 3:
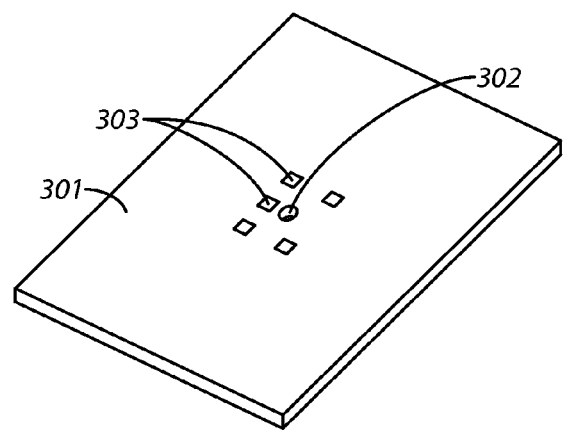
FIG. 3 is a perspective view in accordance with the disclosure.

FIG. 3 illustrates a small printed circuit board 301 configured to receive the aforementioned integrated circuit package 201. In particular, this printed circuit board 301 includes an aperture 302 disposed there through and a plurality of electrically-conductive electrodes 303 disposed thereon. So configured, the integrated circuit package 201 can be mounted and installed on the printed circuit board 301 such that apertures 202 and 302 of each component are coaxially aligned in substantial registration with one another and such that the electrodes 203 of the integrated circuit package 201 are physically and electrically connected to the appropriate corresponding electrodes 303 on the printed circuit board 301.

Figure 4:
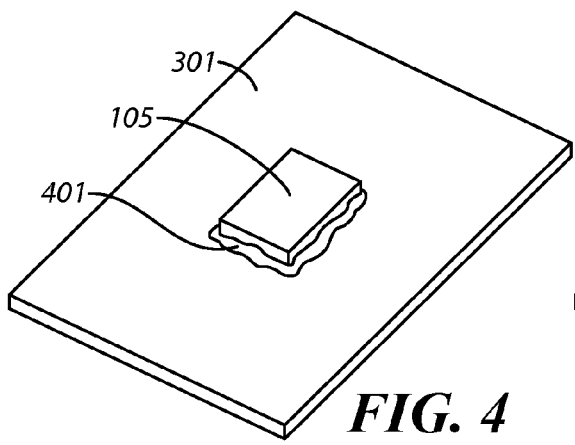
FIG. 4 is a perspective view in accordance with the disclosure.

FIG. 4 shows further details of an aspect of the disclosure, with a sealing material 401 disposed about the periphery of the integrated circuit package 201 to isolate the integrated circuit package 201 and seal the assembly from the external atmosphere. It will be appreciated by those skilled in the art that a variety of materials may be employed in this regard, including adhesives, potting materials, and the like. So configured, the first pressure sensor 105 will only respond to pressure variations as sensed due to gas flow through the aperture 302 in the printed circuit board 301.

Figure 5:
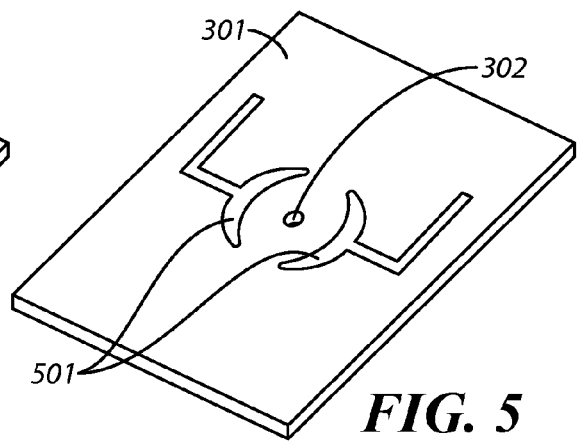
FIG. 5 is a perspective view in accordance with the disclosure.

FIG. 5 depicts the opposite side of the printed circuit board 301 (as compared to the preceding views). At least two electrically-conductive traces 501 are disposed on this side of the printed circuit board 301. In this illustrative example, these electrically-conductive traces 501 are arcuate in shape, of substantially the same size and configuration, and disposed substantially equidistant on opposing sides of the aperture 302 through the printed circuit board 301. Those skilled in the art will recognize that the printed circuit board 301 will likely include other and further electrically-conductive traces; however, for the sake of simplicity and clarity, these figures only display minimal electrically-conductive trace features.

Figure 6:
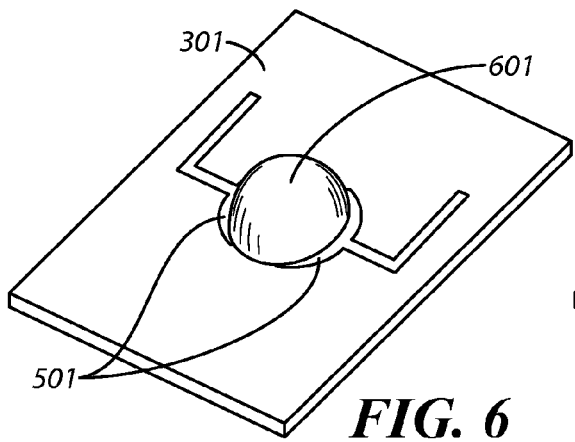
FIG. 6 is a perspective view in accordance with the disclosure.

FIG. 6 depicts a fluid-filled bladder 601 secured to the printed circuit board 301 over aperture 302 using, for example, an adhesive of choice. More particularly, the fluid-filled bladder 601 is sealed to the printed circuit board 301 to create a fluid-filled environment within the fluid-filled bladder 601 that is pneumatically isolated from the external environment.

The fluid-filled bladder 601 comprises an elastic, resilient material, and is constructed and arranged so as to deform in a predictable manner in response to an external force acting thereon, and return to its original non-deformed configuration upon the release of this external force. Accordingly, one of skill in the art will appreciate that any of a variety of rubber, plastic, or like materials that exhibit elastic deformation under load, may be utilized for this application.

The fluid-filled bladder 601 is at least substantially filled with at least one fluid of choice. "Fluids," of course, include both liquids and gases. For many application settings this fluid comprises at least one gas (such as, but not limited to, air).

Figure 7:
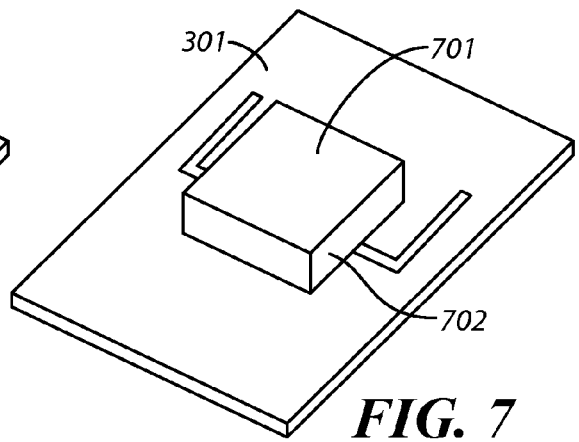
FIG. 7 is a perspective view in accordance with the disclosure.

Referring to FIG. 7, a cap 701 comprised of solid material can then be disposed over the fluid-filled bladder 601. This cap 701 has a top upon which the stylus nib 102 can press and sides 702 that extend downwardly around the fluid-filled bladder 601. This cap 701 can assume any of a variety of form factors. In this example the cap 701 has a square form factor. Other possibly useful examples include but are not limited to a circular form factor, a hexagonal form factor, and so forth.

Figure 8:
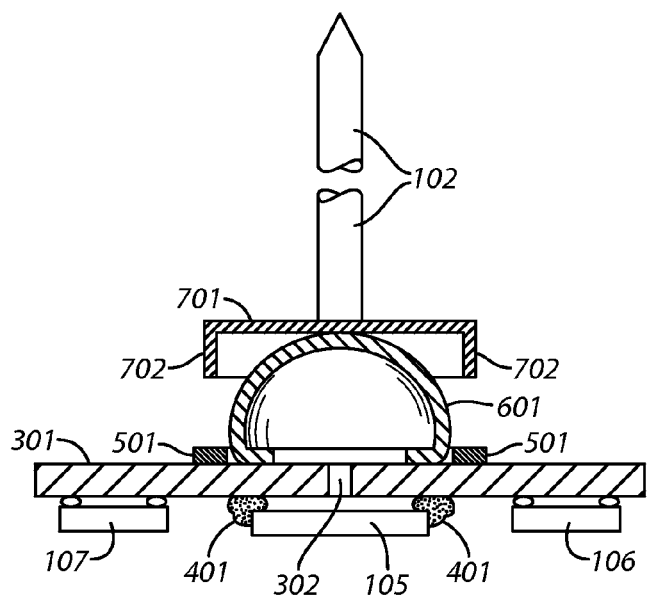
FIG. 8 is a side elevational sectioned view in accordance with the disclosure.

As shown in FIG. 8, the top of the cap 701 can interface with the stylus nib 102 (either directly as illustrated in the exemplary embodiment, or via an intervening linkage). As the stylus nib 102 presses upon the cap 701, the cap 701 in turn physically engages the fluid-filled bladder 601. The fluid-filled bladder 601 deforms in response to this force, and the deformation leads to a change in bladder pressure detected by the first pressure sensor 105 coupled to the control circuit 103.

In this illustrative example, the sides 702 of the cap 701 serve, at least in part, as a mechanical stop that prevents the fluid-filled bladder 601 from deforming beyond a given amount of deformation. By one approach, the cap 701 comprises, at least in part, an electrically-conductive material. So configured, when the sides 702 of the cap 701 physically contact the printed circuit board 301 such that further deformation of the fluid-filled bladder 601 is prevented, the electrically-conductive portion of the cap 701 will also complete an electrical circuit by bridging the electrically-conductive traces 501 on the printed circuit board 301. Completing this circuit can serve, in turn, as a corresponding signal to the control circuit 103 that the maximum-permitted deformation of the fluid-filled bladder 601 has been reached.

When the user of the stylus imparts less force on the stylus nib 102, deformation of the bladder 601 is reversed. In turn, the first pressure sensor 105 senses a decrease in pressure and this change is converted into an appropriate control signal by the control circuit 103 for use in the stylus application.

At least two pressure sensors 105 and 106 may be employed to provide for error correction where errors may be induced by atmospheric pressure variations (due, for example, to changes in altitude and/or local weather conditions). Sensitivity of the sensing mechanism can be made effectively linear by setting the ratio of the active volume (that which changes) relative to the total volume (volume that changes plus the volume that is static).

The configuration described above for the mechanical stop acting in combination with the electrically-conductive traces 501 defines a maximum travel of the stylus nib 102, and thus the maximum pressure within the compressible bladder. Minimum pressure on this compressible bladder, of course, may occur when the user imposes no loading on the stylus nib 102.

As will be appreciated by those skilled in the art, the ideal gas law states that PV=nRT (where P=pressure, V=volume, n=moles, R=gas constant, and T=temperature). This simplifies to PV=kT where k is a constant. Temperature can be measured by the aforementioned and co-located temperature sensor 107 and, might simply correspond to, for example, the forward voltage on a diode or on an NPN transistor that has its emitter grounded while the base and collector are shorted to effect a diode. With T known at any time, the gas law further simplifies to PV=K, or P1/P2=V2/V1 where K is presumed to be fixed. The latter equation demonstrates that P varies inversely with volume and that this variation is non-linear. The control circuit 103 can easily process such a relationship using, for example, a corresponding lookup table.

The foregoing equation can be further rewritten as P1/P2= (VT−ΔV)/VT where VT is the total volume at rest and is ΔV is the change in volume due to an application of a maximum permitted force. The accommodated range (i.e., P2−P1) is [P2−P1]=P2 [ΔV/VT]. This equation shows that the ratio of the active volume to the total volume can be used to adapt the stylus force range to a corresponding pressure sensor range. Accordingly, a smaller ratio will reduce the available range.

Such a stylus 100 can offer nib force sensing in an economical manner that effectively converts sensed pressure into a corresponding detected forced. In particular, by one approach these teachings provide a gas-filled bladder that is configured to sense a pressure that corresponds to a force being applied to a stylus nib over a nib force range such that the corresponding bladder volume for the gas-filled bladder aligns that nib force range with a sensor pressure range for the first pressure sensor. The use of a fluid-filled bladder 601 also offers the benefits of a nice user feel along with the opportunity for fine resolution as regards the detection of a particular force level being imposed upon the stylus nib 102 by the user during use. Such an approach also offers the designer a considerable degree of freedom regarding sensor behavior through adjustments of the bladder volume.

The present disclosure may be embodied in other specific forms without departing from its essential characteristics. For example, by one approach the aforementioned fluid-filled bladder 601 can be filled with a liquid rather than a gas. Gas, of course, is compressible while a fluid is not. Presuming the use of a pressure sensor that will work satisfactorily with a liquid these same teachings can be applied to good advantage. Note, for example, that temperature effects are greatly reduced and force coupling is more direct since gas compression is not involved.

Also, in the gas case the bladder 601 is primarily what stores potential energy but in the liquid case, due to incompressibility, the bladder material may be more subject to stretching and thus energy storage. The liquid case is therefore potentially not governed or dominated by the gas law. Accordingly it may be useful to instead employ a model of the elasticity of the bladder material across a useful range of operating temperatures.

The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:
1. A stylus comprising:
   a deformable bladder filled with at least one gas; and
   at least a first pressure sensor responsive to pressure changes in the deformable bladder, the pressure changes capable of being processed to provide force signals representing a forces applied to a stylus nib as comprises a part of the stylus.

2. The stylus of claim 1 wherein the first pressure sensor is configured to sense a deformable bladder gas pressure that corresponds to force being applied to the stylus nib.

3. The stylus of claim 2 further comprising:
at least a second pressure sensor disposed within the stylus and configured to sense ambient air pressure.

4. The stylus of claim 3 further comprising:
a control circuit operably coupled to the first and second pressure sensor and configured to determine a gauge pressure value as corresponds to force being applied to the stylus nib.

5. The stylus of claim 4 further comprising:
a temperature sensor operably coupled to the control circuit;
wherein the control circuit is configured to use temperature information from the temperature sensor when determining the gauge pressure value.

6. The stylus of claim 5 further comprising:
a mechanical stop to prevent the deformable bladder from deforming beyond a given amount of deformation.

7. The stylus of claim 6 wherein the mechanical stop includes electrically-conductive surfaces that complete an electric circuit when the deformable bladder reaches the given amount of deformation.

8. The stylus of claim 1 wherein the deformable bladder is configured to deform in response to application of the force to the stylus nib and that is pneumatically coupled to the first pressure sensor.

9. A force-sensitive stylus comprising:
a barrel;
a nib;
a first pressure sensor disposed within the barrel and configured to sense an air pressure that corresponds to force being applied to the nib;
a second pressure sensor disposed within the barrel and configured to sense ambient air pressure;
a control circuit operably coupled to the first and second pressure sensor and configured to determine a gauge air pressure value corresponding to force being applied to the nib.

10. The force-sensitive stylus of claim 9 further comprising:
an air bladder that deforms in response to force being applied to the stylus nib and that is pneumatically coupled to the first pressure sensor.

11. The force-sensitive stylus of claim 10 further comprising:
a mechanical stop configured to prevent the air bladder from deforming beyond a given amount of deformation.

12. The force-sensitive stylus of claim 11 wherein the mechanical stop includes a cap disposed over at least a part of the air bladder.

13. The force-sensitive stylus of claim 12 wherein the cap is comprised, at least in part, of electrically-conductive material.

14. The force-sensitive stylus of claim 13 further comprising:
at least two electrically-conductive traces disposed to contact the cap when the cap stops further deformation of the air bladder such that the electrically-conductive material completes an electrical circuit to thereby provide a corresponding signal.

15. A force-sensitive stylus comprising:
a barrel;
a nib;
a first pressure sensor disposed within the barrel and having a gas-filled bladder configured to sense a pressure that corresponds to a force being applied to the nib over a nib force range such that a bladder volume as corresponds to the gas-filled bladder aligns the nib force range with a sensor pressure range for the first pressure sensor;
a second pressure sensor disposed within the barrel and configured to sense ambient air pressure;
a control circuit operably coupled to the first and second pressure sensor and configured to determine a gauge air pressure value corresponding to force being applied to the nib.

* * * * *